(12) United States Patent
Nomoto et al.

(10) Patent No.: US 11,879,230 B2
(45) Date of Patent: Jan. 23, 2024

(54) CAB AND WORK VEHICLE

(71) Applicant: KOMATSU LTD., Tokyo (JP)

(72) Inventors: Masayoshi Nomoto, Tokyo (JP); Makoto Sasaki, Tokyo (JP); Hiroaki Tanaka, Tokyo (JP); Takeshi Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 138 days.

(21) Appl. No.: 17/613,145

(22) PCT Filed: Jun. 18, 2020

(86) PCT No.: PCT/JP2020/023904
§ 371 (c)(1),
(2) Date: Nov. 22, 2021

(87) PCT Pub. No.: WO2020/256049
PCT Pub. Date: Dec. 24, 2020

(65) Prior Publication Data
US 2022/0220699 A1    Jul. 14, 2022

(30) Foreign Application Priority Data
Jun. 19, 2019    (JP) ................................ 2019-113948

(51) Int. Cl.
| B62D 33/06 | (2006.01) |
| B62D 25/04 | (2006.01) |
| B62D 27/02 | (2006.01) |
| E02F 9/16 | (2006.01) |
| B62D 25/06 | (2006.01) |

(52) U.S. Cl.
CPC .............. *E02F 9/163* (2013.01); *B62D 25/04* (2013.01); *B62D 25/06* (2013.01); *B62D 27/023* (2013.01)

(58) Field of Classification Search
CPC ...... B62D 27/023; B62D 25/04; B62D 25/06; B62D 33/06; B62D 33/0617; E02F 9/16; E02F 9/163
USPC ................ 296/190.03, 9, 30, 203.01, 203.03
See application file for complete search history.

(56) References Cited

U.S. PATENT DOCUMENTS

| 4,088,364 A | * | 5/1978 | Termont ............. B60H 1/00378 |
| | | | 180/89.12 |
| 6,032,980 A | * | 3/2000 | Rapp ................... B62D 33/044 |
| | | | 52/657 |

(Continued)

FOREIGN PATENT DOCUMENTS

| CN | 101018683 A | 8/2007 |
| CN | 204781067 U | 11/2015 |

(Continued)

*Primary Examiner* — Dennis H Pedder
(74) *Attorney, Agent, or Firm* — Faegre Drinker Biddle & Reath LLP

(57) ABSTRACT

A cab includes: a pillar member; a beam member; and a rib member. The pillar member extends in an up-down direction. The beam member extends in a left-right direction. The beam member is connected to an upper end of the pillar member. The rib member is provided at a corner portion where the pillar member and the beam member intersect with each other. The rib member is connected to the pillar member and the beam member. The rib member is embedded in at least one of the pillar member and the beam member.

11 Claims, 11 Drawing Sheets

(56) References Cited

U.S. PATENT DOCUMENTS

| | | | | |
|---|---|---|---|---|
| 6,582,010 B2* | 6/2003 | Sakyo | ............... | B62D 27/023 |
| | | | | 296/190.08 |
| 7,048,082 B2* | 5/2006 | Mori | ................. | B62D 23/005 |
| | | | | 180/311 |
| 2009/0026803 A1 | 1/2009 | Yano et al. | | |

FOREIGN PATENT DOCUMENTS

| JP | 2008-265604 A | 11/2008 |
|---|---|---|
| JP | 2008-273410 A | 11/2008 |
| JP | 2010-90567 A | 4/2010 |
| JP | 2011-105032 A | 6/2011 |
| JP | 2017-031633 A | 2/2017 |

* cited by examiner

CAB AND WORK VEHICLE

TECHNICAL FIELD

The present disclosure relates to a cab and a work vehicle.

BACKGROUND ART

For example, Japanese Patent Laying-Open No. 2011-105032 (PTL 1) discloses a cab for a hydraulic excavator, including a pair of left and right pillars, a beam member arranged between the pair of left and right pillars, and a gusset plate placed at a corner portion where the pillars and the beam member are connected to each other.

CITATION LIST

Patent Literature

PTL 1: Japanese Patent Laying-Open No. 2011-105032

SUMMARY OF INVENTION

Technical Problem

In the cab disclosed in PTL 1 above, the gusset plate is placed at the corner portion where the pillars and the beam member are connected to each other, in order to increase the strength of the cab. However, the gusset plate has a substantially triangular shape in a plan view, and is provided such that two sides of the substantially triangular shape orthogonal to each other are joined to inner surfaces of the pillars and the beam member. Therefore, it is concerned that a space in the cab surrounded by the pillars and the beam member may be invaded greatly by the gusset plate.

Accordingly, an object of the present disclosure is to provide a highly-rigid cab in which a wide space can be secured, and a work vehicle including the cab.

Solution to Problem

A cab according to the present disclosure includes: a pillar member; a beam member; and a rib member. The pillar member extends in an up-down direction. The beam member extends in a left-right direction. The beam member is connected to an upper end of the pillar member. The rib member is provided at a corner portion where the pillar member and the beam member intersect with each other. The rib member is connected to the pillar member and the beam member. The rib member is embedded in at least one of the pillar member and the beam member.

"The rib member is embedded in at least one of the pillar member and the beam member" means that at least a part of the rib member is arranged in a recessed portion provided in at least one of the pillar member and the beam member.

A work vehicle according to the present disclosure includes the above-described cab.

Advantageous Effects of Invention

According to the present disclosure, there can be provided a highly-rigid cab in which a wide space can be secured, and a work vehicle including the cab.

DESCRIPTION OF EMBODIMENTS

Figure 1:
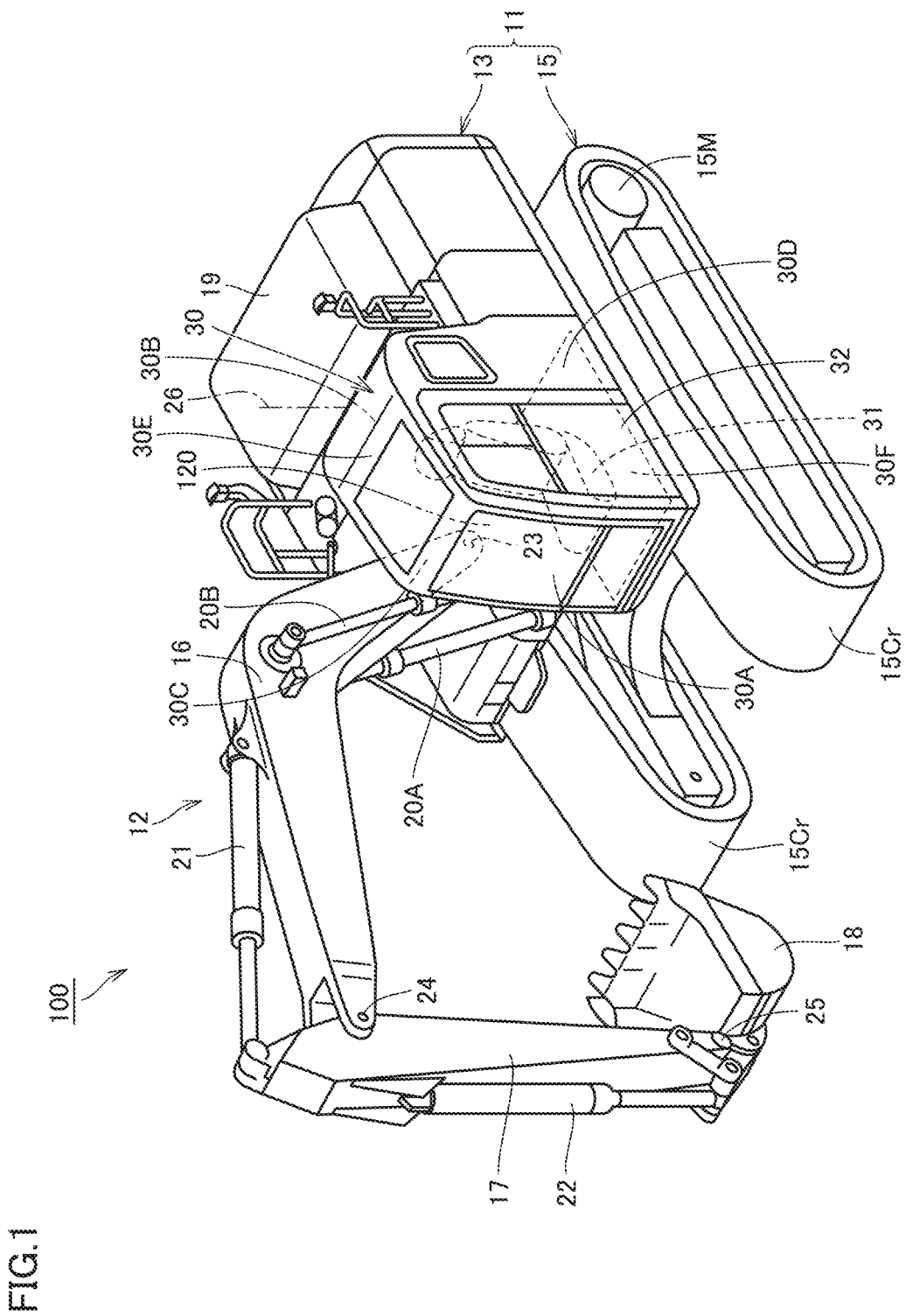
FIG. 1 is a perspective view showing a hydraulic excavator.

An embodiment of the present disclosure will be described with reference to the drawings. In the drawings referenced below, the same or corresponding components are denoted by the same reference numerals.

FIG. 1 is a perspective view showing a hydraulic excavator. First, an overall structure of the hydraulic excavator including a cab according to the present embodiment will be described.

As shown in FIG. 1, a hydraulic excavator 100 includes a vehicular body 11 and a work implement 12. Vehicular body 11 includes a revolving unit 13 and a traveling unit 15.

Traveling unit 15 includes a pair of crawler belts 15Cr and a travel motor 15M. Hydraulic excavator 100 can travel by rotation of crawler belts 15Cr. Travel motor 15M is provided as a drive source of traveling unit 15. Traveling unit 15 may include a wheel (tire).

Revolving unit 13 is provided on traveling unit 15. Revolving unit 13 can swing about the center of swing 26 with respect to traveling unit 15. The center of swing 26 corresponds to an axis extending in the up-down direction. Revolving unit 13 includes a cab (operator's cab) 30. A living space 120 for an operator is formed in cab 30. An operator's seat 31 is provided in living space 120 for the operator. The operator rides in living space 120 and is seated on operator's seat 31 to operate hydraulic excavator 100.

Revolving unit 13 includes an engine compartment 19 and a counter weight that is provided in a rear portion of revolving unit 13. Engine compartment 19 accommodates an engine, a hydraulic oil tank, an air cleaner, a hydraulic pump, and the like.

Work implement 12 is attached to vehicular body 11. Work implement 12 is attached to revolving unit 13. Work implement 12 performs operations such as excavation of soil. Work implement 12 includes a boom 16, an arm 17, and a bucket 18.

Boom 16 is pivotably coupled to vehicular body 11 (revolving unit 13) through a boom pin 23. Arm 17 is pivotably coupled to boom 16 through an arm pin 24. Bucket 18 is pivotably coupled to arm 17 through a bucket pin 25.

Work implement 12 further includes boom cylinders 20A and 20B, an arm cylinder 21, and a bucket cylinder 22.

Boom cylinders 20A and 20B, arm cylinder 21, and bucket cylinder 22 each are a hydraulic cylinder driven by hydraulic oil. Boom cylinders 20A and 20B, which are provided as one pair, each are provided on a corresponding one of both sides of boom 16, and operate boom 16 to pivot. Arm cylinder 21 operates arm 17 to pivot. Bucket cylinder 22 operates bucket 18 to pivot.

Herein, the front-rear direction refers to a front direction and a rear direction of the operator seated on operator's seat 31. The direction facing the operator seated on operator's seat 31 is defined as the front direction, and the direction backward the operator seated on operator's seat 31 is defined as the rear direction. The left-right (lateral) direction refers to a left direction and a right direction of the operator seated on operator's seat 31. When the operator seated on operator's seat 31 faces the front, the right side of the operator is defined as the right direction. When the operator seated on operator's seat 31 faces the front, the left side of the operator is defined as the left direction. The up-down direction refers to a direction orthogonal to a plane including the front-rear direction and the left-right direction. The side downward the ground is defined as a lower side, and the side upward the sky is defined as an upper side.

Figure 2:
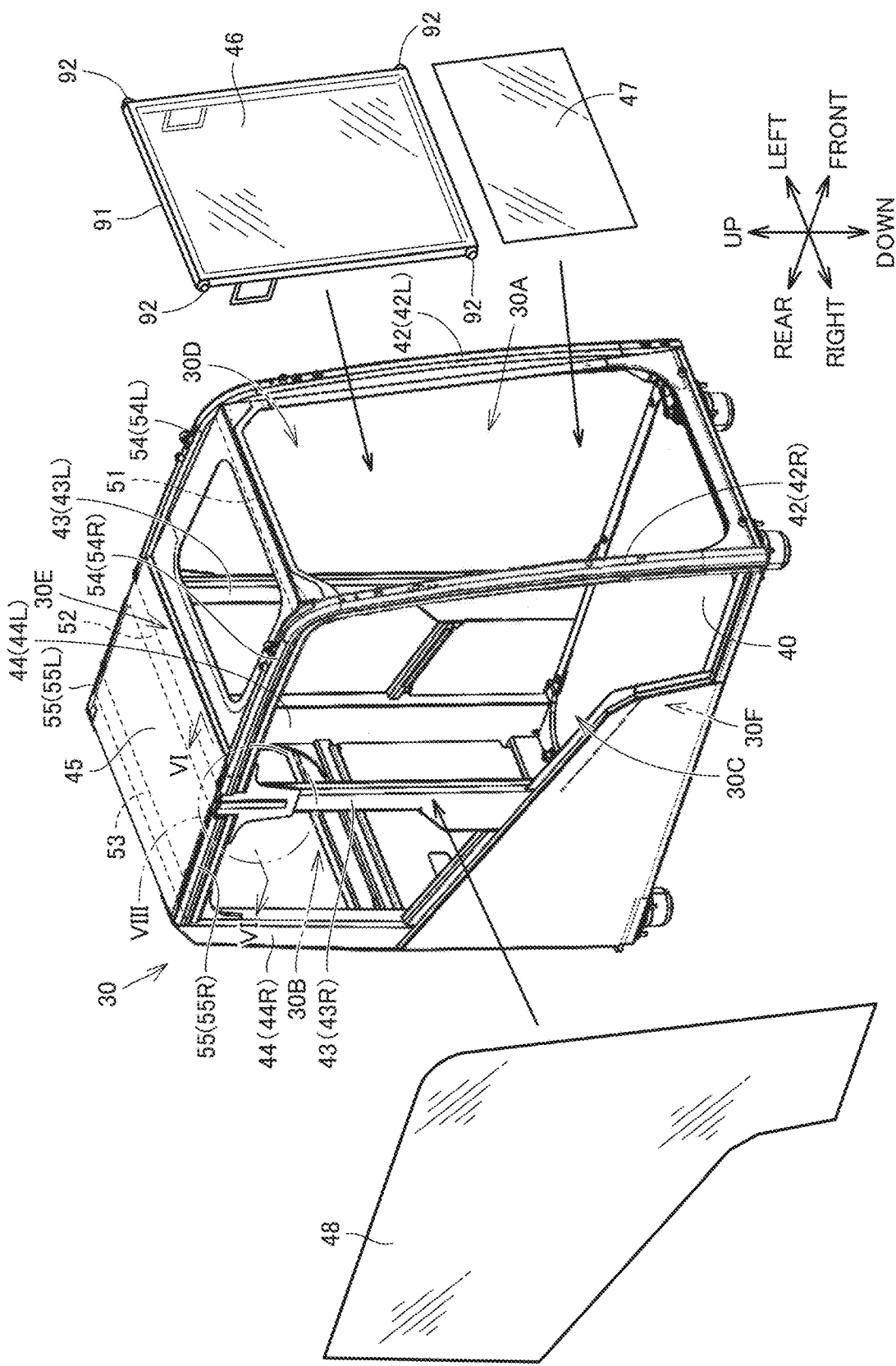
FIG. 2 is a perspective view showing a frame structure of a cab in FIG. 1.
Figure 3:
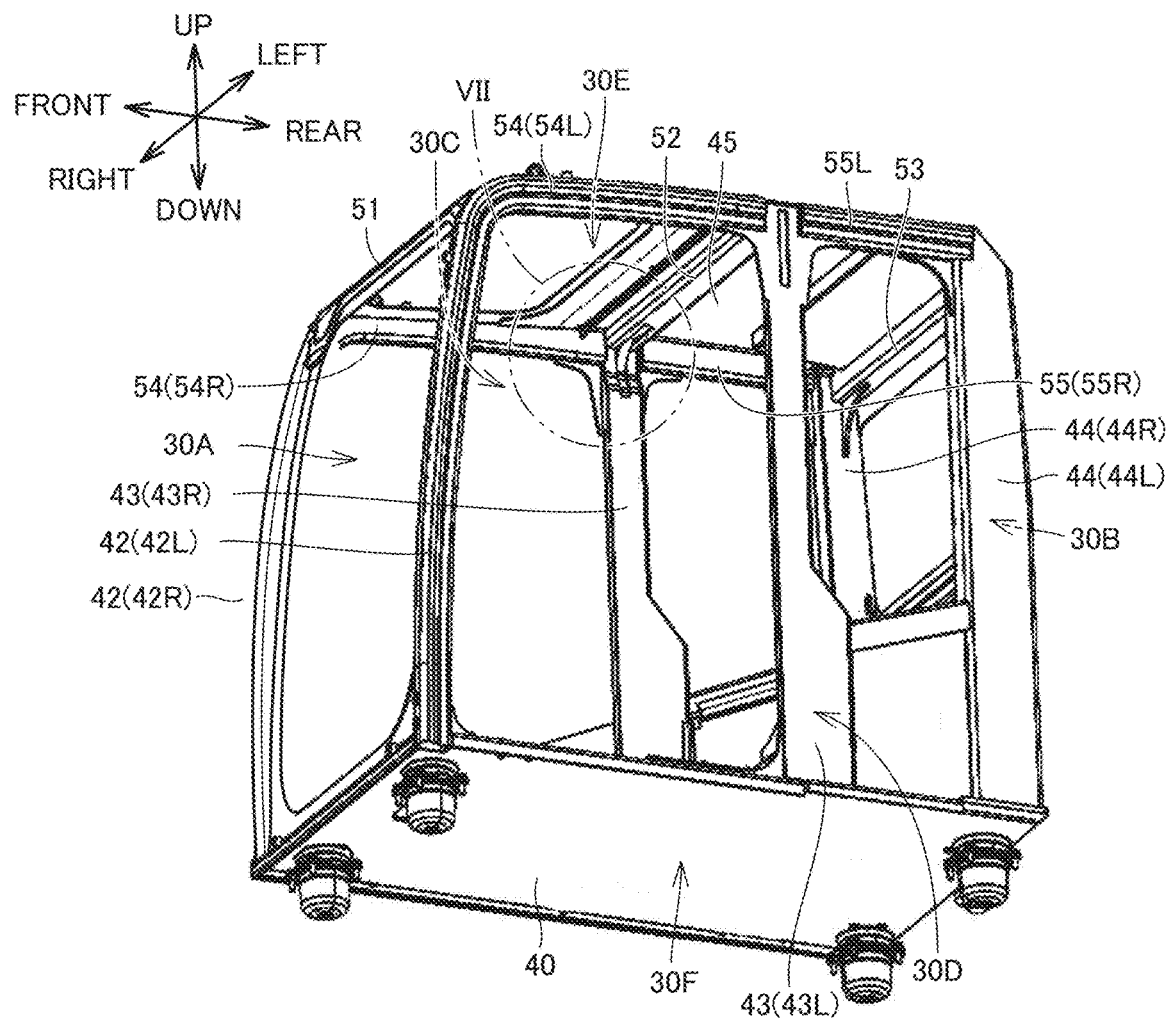
FIG. 3 is another perspective view showing the frame structure of the cab in FIG. 1.

FIGS. 2 and 3 are perspective views showing a frame structure of the cab in FIG. 1. Next, the structure of cab 30 will be described.

As shown in FIGS. 1 to 3, cab 30 is formed of a box having a rectangular parallelepiped shape and including a front surface 30A, a rear surface 30B, a right surface 30C, a left surface 30D, a top surface 30E, and a bottom surface 30F.

Front surface 30A is provided to face the front side. Rear surface 30B is provided to face the rear side. Right surface 30C is provided to face the right side. Right surface 30C faces work implement 12 in the left-right direction. Left surface 30D is provided to face the left side. Top surface 30E is provided to face the upper side. Bottom surface 30F is provided to face the lower side. Bottom surface 30F faces a frame of revolving unit 13 in the up-down direction.

As shown in FIGS. 2 and 3, cab 30 includes a floor member 40, a pair of left and right pillar members 42 (42L and 42R), a pair of left and right pillar members 43 (43L and 43R), a pair of left and right pillar members 44 (44L and 44R), beam members 51, 52 and 53, a pair of left and right girder members 54 (54L and 54R), and a pair of left and right girder members 55 (55L and 55R).

Floor member 40, pillar members 42, pillar members 43, pillar members 44, beam members 51, 52 and 53, girder members 54, and girder members 55 are integrally formed with each other by welding, to thereby form a cab frame.

Floor member 40 is provided on bottom surface 30F. Floor member 40 is formed of a plate member (e.g., a steel plate).

Each of pillar members 42, pillar members 43, pillar members 44, beam members 51, 52 and 53, girder members 54, and girder members 55 is formed of a frame member extending in one direction in an elongated manner. Pillar members 42, pillar members 43, pillar members 44, beam members 51, 52 and 53, girder members 54, and girder members 55 are provided around living space 120 for the operator. Living space 120 for the operator is provided at a position surrounded by pillar members 42, pillar members 43, pillar members 44, beam members 51, 52 and 53, girder members 54, and girder members 55.

Pillar members 42, pillar members 43 and pillar members 44 are erected on floor member 40. Pillar members 42, pillar members 43 and pillar members 44 are connected to floor member 40. Pillar members 42, pillar members 43 and pillar members 44 extend in the up-down direction between top surface 30E and bottom surface 30F.

Pillar member 42L and pillar member 42R are arranged to be spaced apart from each other in the left-right direction. Pillar member 42L and pillar member 42R are located to face each other in the left-right direction. Pillar member 42L is provided at a corner portion where front surface 30A and left surface 30D intersect with each other. Pillar member 42R is provided at a corner portion where front surface 30A and right surface 30C intersect with each other. Pillar member 42L is provided at a front end of left surface 30D. Pillar member 42R is provided at a front end of right surface 30C. Pillar member 42L and pillar member 42R are provided on the front side of operator's seat 31 shown in FIG. 1.

Pillar member 43L and pillar member 43R are arranged to be spaced apart from each other in the left-right direction. Pillar member 43L and pillar member 43R are located to face each other in the left-right direction. Pillar member 43L and pillar member 43R are provided on the lateral sides of operator's seat 31 shown in FIG. 1. Pillar member 43L is provided on left surface 30D. Pillar member 43R is provided on right surface 30C. Pillar member 43L and pillar member 43R are provided on the rear side of pillar member 42L and pillar member 42R.

Pillar member 44L and pillar member 44R are arranged to be spaced apart from each other in the left-right direction. Pillar member 44L and pillar member 44R are located to face each other in the left-right direction. Pillar member 44L is provided at a corner portion where left surface 30D and rear surface 30B intersect with each other. Pillar member 44L is provided at a rear end of left surface 30D. Pillar member 44R is provided at a corner portion where right surface 30C and rear surface 30B intersect with each other. Pillar member 44R is provided at a rear end of right surface 30C. Pillar member 44L and pillar member 44R are provided on the rear side of pillar member 43L and pillar member 43R. Pillar member 44L and pillar member 44R are provided on the rear side of operator's seat 31 shown in FIG. 1.

Beam members 51, 52 and 53, girder members 54 and girder members 55 are provided on top surface 30E. Beam member 51, beam member 52 and beam member 53 extend in the left-right direction. Girder members 54 and girder members 55 extend in the front-rear direction.

Beam member 51 is provided at a corner portion where front surface 30A and top surface 30E intersect with each other. A left end of beam member 51 is connected to a connection portion that connects pillar member 42L and below-described girder member 54L. A right end of beam member 51 is connected to a connection portion that connects pillar member 42R and below-described girder member 54R.

Beam member 52 is provided on the rear side of beam member 51. A right end of beam member 52 is connected to an upper end of pillar member 43R. A left end of beam member 52 is connected to an upper end of pillar member 43L.

Beam member 53 is provided at a corner portion where top surface 30E and rear surface 30B intersect with each other. Beam member 53 is provided on the rear side of beam member 52. A right end of beam member 53 is connected to an upper end of pillar member 44R. A left end of beam member 53 is connected to an upper end of pillar member 44L.

Girder member 54L and girder member 54R are arranged to be spaced apart from each other in the left-right direction. Girder member 54L and girder member 54R are located to face each other in the left-right direction.

Girder member 54L is provided at a corner portion where left surface 30D and top surface 30E intersect with each other. A front end of girder member 54L is connected to an upper end of pillar member 42L. Girder member 54L and pillar member 42L are formed of an integrated frame member. A rear end of girder member 54L is connected to an upper end of pillar member 43L. Girder member 54R is provided at a corner portion where right surface 30C and top surface 30E intersect with each other. A front end of girder member 54R is connected to an upper end of pillar member 42R. Girder member 54R and pillar member 42R are formed of an integrated frame member. A rear end of girder member 54R is connected to an upper end of pillar member 43R.

Girder member 55L and girder member 55R are arranged to be spaced apart from each other in the left-right direction. Girder member 55L and girder member 55R are located to face each other in the left-right direction.

Girder member 55L is provided at a corner portion where left surface 30D and top surface 30E intersect with each other. A front end of girder member 55L is connected to an upper end of pillar member 43L. A rear end of girder member 55L is connected to an upper end of pillar member 44L. Girder member 55R is provided at a corner portion where right surface 30C and top surface 30E intersect with each other. A front end of girder member 55R is connected to an upper end of pillar member 43R. A rear end of girder member 55L is connected to an upper end of pillar member 44R.

As shown in FIGS. 1 and 2, cab 30 further includes a ceiling member 45 and a door member 32. Ceiling member 45 is provided on top surface 30E. Ceiling member 45 is formed of a plate member (e.g., a steel plate). Ceiling member 45 is provided on beam members 51, 52 and 53, girder members 54, and girder members 55.

Door member 32 is provided on left surface 30D so as to be openable and closable. Door member 32 is opened and closed when the operator enters and leaves living space 120.

As shown in FIG. 2, cab 30 further includes a front transparent member 46, a lower transparent member 47 and a lateral transparent member 48. Each of front transparent member 46, lower transparent member 47 and lateral transparent member 48 is formed of a transparent member that allows light to transmit therethrough. Each of front transparent member 46, lower transparent member 47 and lateral transparent member 48 is formed of, for example, glass or acryl.

Front transparent member 46 and lower transparent member 47 are provided on front surface 30A. Front transparent member 46 and lower transparent member 47 are provided between pillar member 42L and pillar member 42R in the left-right direction. Front transparent member 46 and lower transparent member 47 are provided on the front side of pillar members 43. Front transparent member 46 and lower transparent member 47 are provided on the front side of operator's seat 31. Front transparent member 46 is provided on the upper side of lower transparent member 47.

Lateral transparent member 48 is provided on right surface 30C. Lateral transparent member 48 is provided across pillar member 42R, pillar member 43R and pillar member 44R in the front-rear direction. Lateral transparent member 48 may be provided only across pillar member 42R and pillar member 43R in the front-rear direction.

Figure 4:
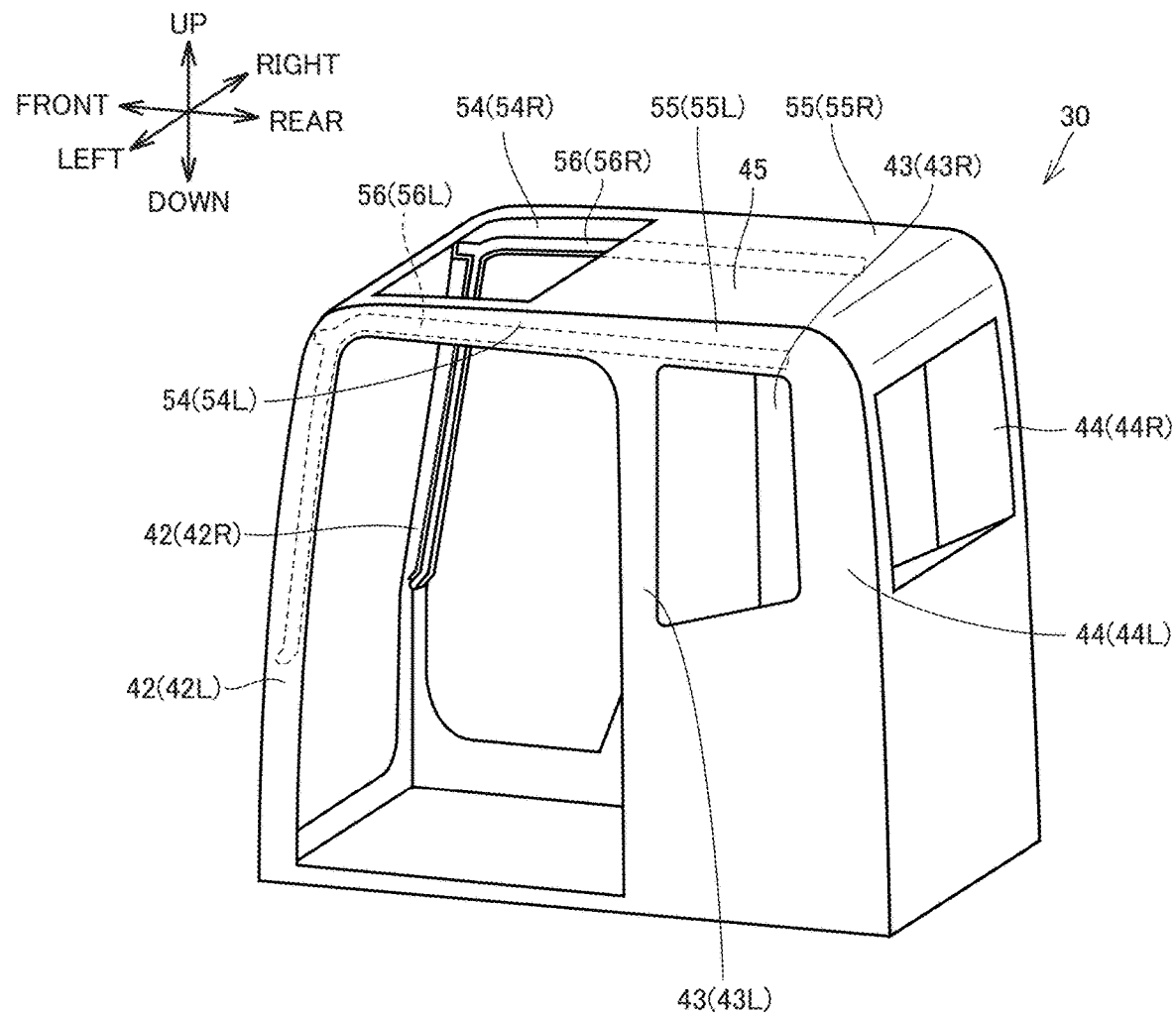
FIG. 4 is a perspective view showing a rail member for guiding a front transparent member in FIG. 2.
Figure 5:
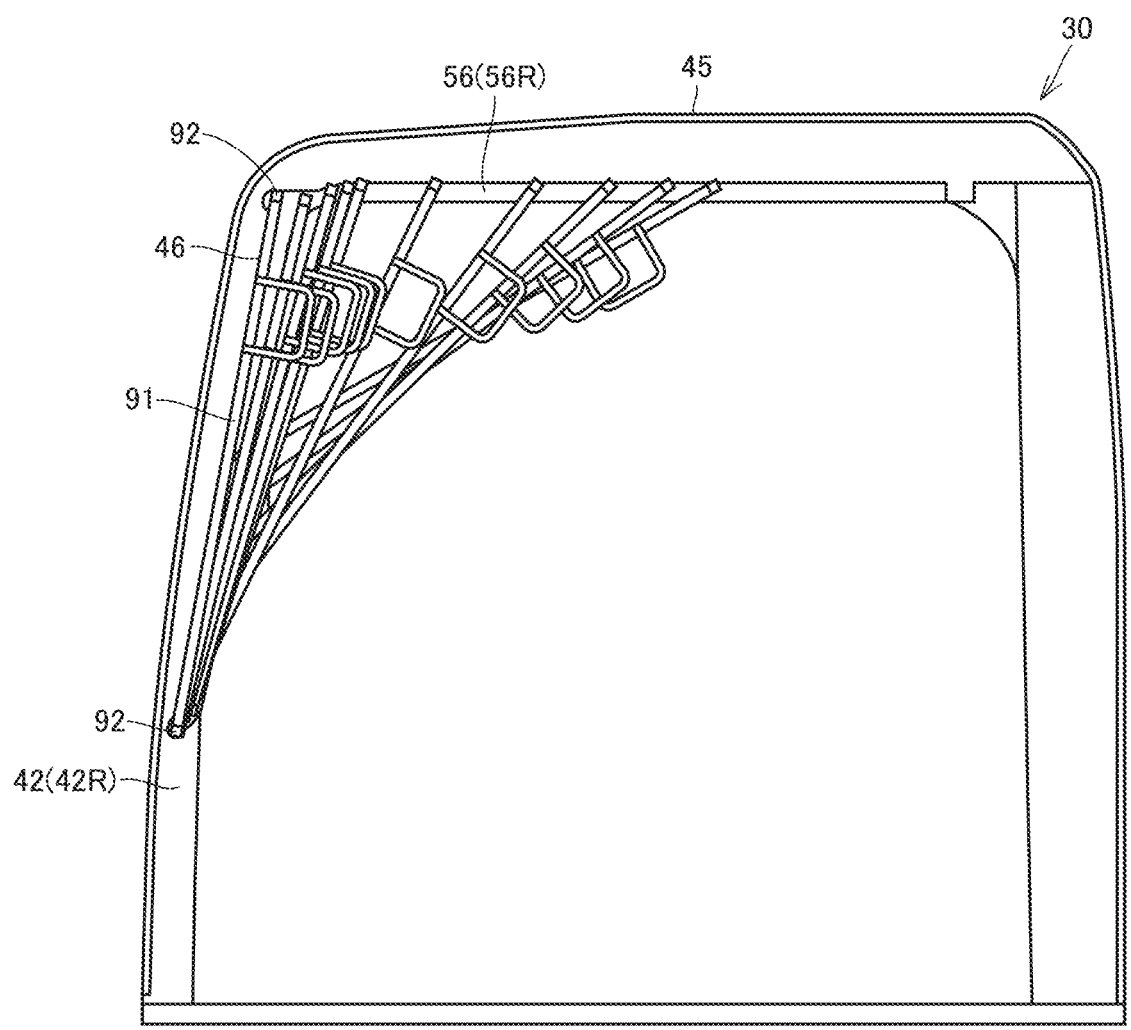
FIG. 5 is a side view showing an operation for opening and closing the front transparent member in FIG. 2.

FIG. 4 is a perspective view showing a rail member for guiding the front transparent member in FIG. 2. FIG. 5 is a side view showing an operation for opening and closing the front transparent member in FIG. 2.

As shown in FIGS. 2, 4 and 5, lower transparent member 47 and lateral transparent member 48 are of fixed type, whereas front transparent member 46 is of movable type that allows front transparent member 46 to be opened and closed. Front transparent member 46 is opened and closed between a position where front surface 30A enters an open state and a position where front surface 30A enters a closed state.

A frame 91 is attached to front transparent member 46. Frame 91 has a frame shape that extends along a perimeter edge of front transparent member 46. Frame 91 has a rectangular frame shape. A plurality of rollers 92 are attached to frame 91. Each roller 92 is rotatable about an axis extending in the left-right direction. The plurality of rollers 92 are provided at four corners of frame 91 having a rectangular frame shape.

Cab 30 further includes a pair of left and right rail members 56 (56L and 56R). Rail members 56 can guide front transparent member 46 that is opened and closed.

Rail member 56L is provided across the corner portion where front surface 30A and left surface 30D intersect with each other and the corner portion where top surface 30E and left surface 30D intersect with each other. Rail member 56L extends in the up-down direction at the corner portion where front surface 30A and left surface 30D intersect with each other. Rail member 56L is attached to pillar member 42L at the corner portion where front surface 30A and left surface 30D intersect with each other. Rail member 56L extends in the front-rear direction at the corner portion where top surface 30E and left surface 30D intersect with each other. Rail member 56L is attached to girder member 54L, pillar member 43L and girder member 55L at the corner portion where top surface 30E and left surface 30D intersect with each other. Rail member 56L extends from pillar member 42L to pillar member 43L and further extends from pillar member 43L toward pillar member 44L in the front-rear direction.

Rail member 56R is provided across the corner portion where front surface 30A and right surface 30C intersect with each other and the corner portion where top surface 30E and right surface 30C intersect with each other. Rail member 56R extends in the up-down direction at the corner portion where front surface 30A and right surface 30C intersect with each other. Rail member 56R is attached to pillar member 42R at the corner portion where front surface 30A and right surface 30C intersect with each other. Rail member 56R extends in the front-rear direction at the corner portion where top surface 30E and right surface 30C intersect with each other. Rail member 56R is attached to girder member 54R, pillar member 43R and girder member 55R at the corner portion where top surface 30E and right surface 30C intersect with each other. Rail member 56R extends from pillar member 42R to pillar member 43R and further extends from pillar member 43R toward pillar member 44R in the front-rear direction.

Each of rail members 56 has a recessed shape that can receive rollers 92. Rollers 92 attached to the left and right sides of frame 91 are fitted into rail member 56L and rail member 56R, respectively. Rollers 92 are guided by rail members 56, and thereby, front transparent member 46 is opened and closed between a position where front surface 30A enters an open state and a position where front surface 30A enters a closed state. When front transparent member 46 is operated to the position where front surface 30A enters the open state, front transparent member 46 moves to top surface 30E.

Next, a connection structure for pillar members 43, beam member 52, girder members 54, and girder members 55 will be described. Although a connection structure for pillar member 43R, beam member 52, girder member 54R, and girder member 55R will be representatively described below, a connection structure for pillar member 43L, beam member 52, girder member 54L, and girder member 55L is also similar.

Figure 6:
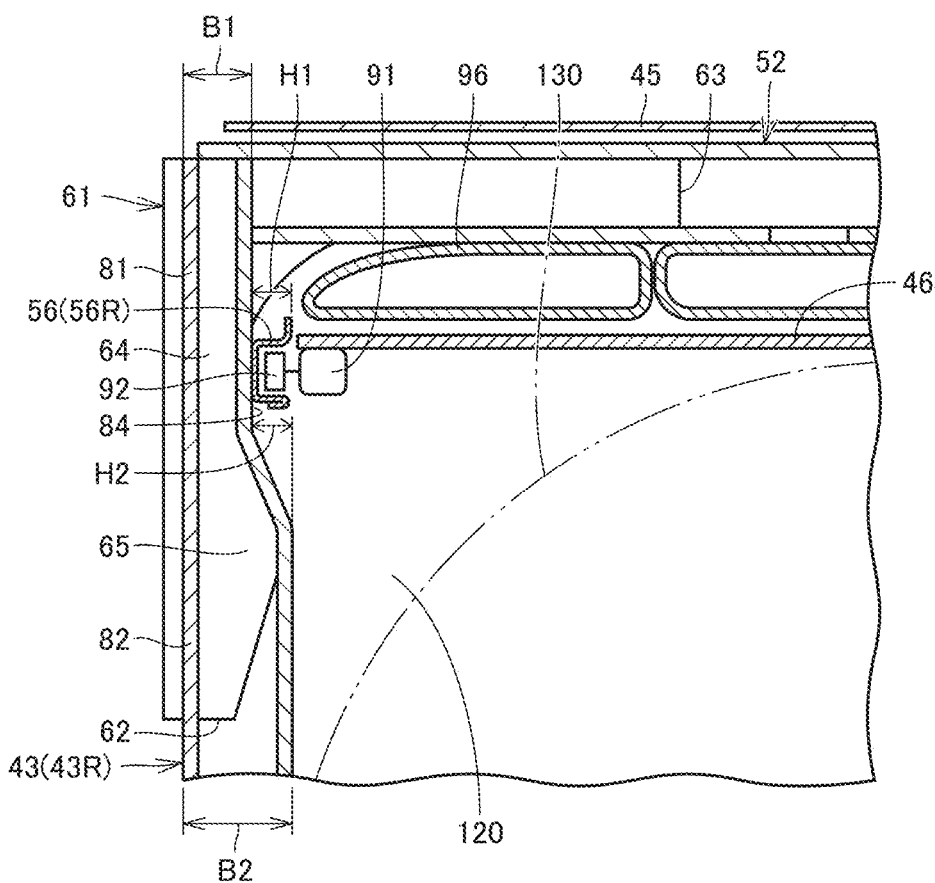
FIG. 6 is a cross-sectional view showing the cab at a corner portion of an upper surface and a right surface.

FIG. 6 is a cross-sectional view showing the cab at the corner portion of the top surface and the right surface. A cross-sectional position shown in FIG. 6 corresponds to a cross-sectional position when seen in a direction indicated by an arrow line VI-VI in FIG. 2.

FIG. 6 shows front transparent member 46 when front transparent member 46 moves to the position where front surface 30A enters the open state, and an operator protection space 130. The ISO standard defines a space to be secured around the operator in order to prevent the operator from being crushed by cab 30 that becomes deformed when hydraulic excavator 100 falls down. Operator protection space 130 corresponds to this space.

As shown in FIG. 6, the right end of beam member 52 is connected to the upper end of pillar member 43R. Beam member 52 and pillar member 43R together form a corner portion that makes an angle of 90°. Living space 120 for the operator is formed on the lateral side of pillar member 43R and on the lower side of beam member 52.

Rail member 56R is provided in living space 120 for the operator. Rail member 56R is provided to pass through the corner portion formed by beam member 52 and pillar member 43R, while extending in the front-rear direction. Rail member 56R is attached to pillar member 43R at a position distant from and below beam member 52.

Cab 30 further includes a duct member 96. Duct member 96 is a duct for an air conditioner through which cold air flows. Duct member 96 is provided in living space 120 for the operator. Duct member 96 is provided below ceiling member 45. Duct member 96 extends in the front-rear direction. Duct member 96 has a flat cross section that is short in the up-down direction and long in the left-right direction, when cut along a plane that is orthogonal to the front-rear direction.

Duct member 96 is provided to pass through the corner portion formed by beam member 52 and pillar member 43R. Duct member 96 is attached to beam member 52 at a position distant from and on the lateral side of pillar member 43R. Duct member 96 is provided, in the up-down direction, between beam member 52 and front transparent member 46 when front transparent member 46 moves to the position where front surface 30A enters the open state.

Figure 7:
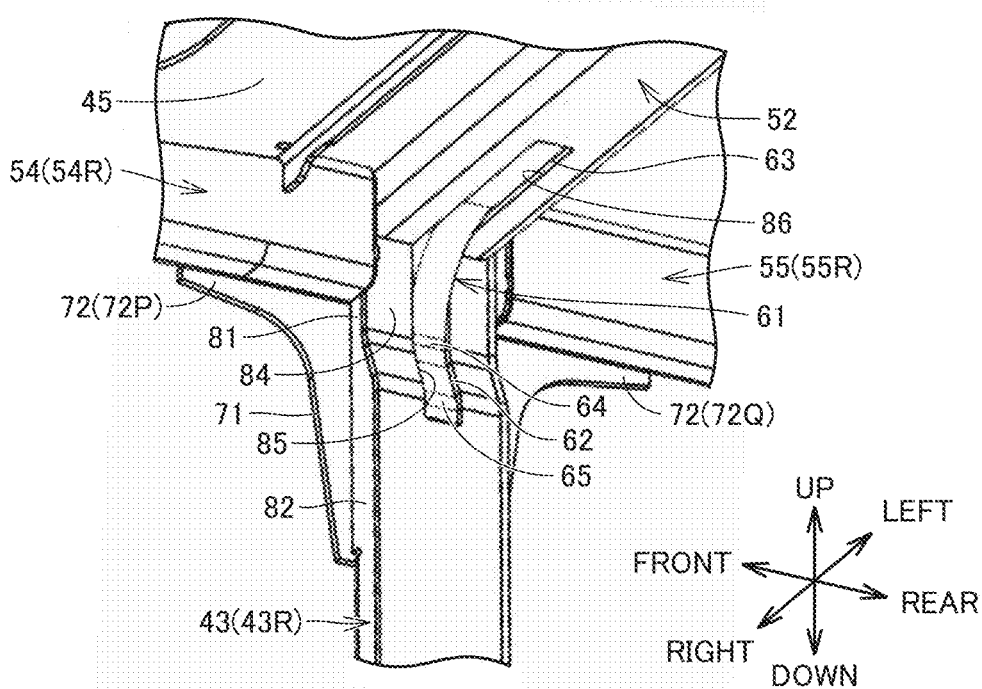
FIG. 7 is a perspective view showing the cab in a range surrounded by a two-dot chain line VII in FIG. 3 in an enlarged manner.
Figure 8:
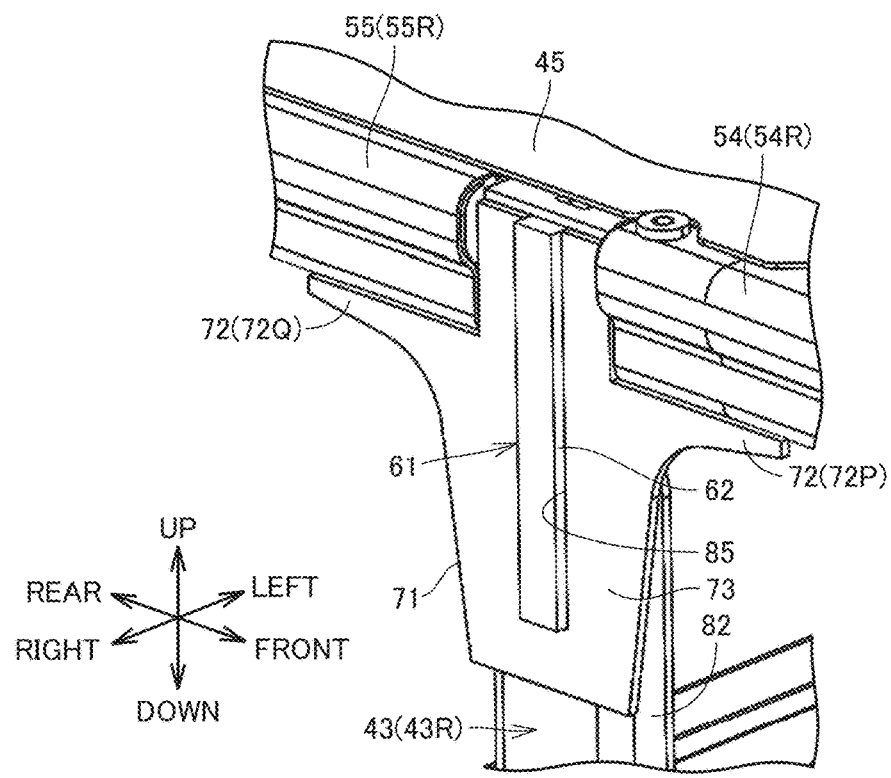
FIG. 8 is a perspective view showing the cab in a range surrounded by a two-dot chain line VIII in FIG. 2 in an enlarged manner.
Figure 9:
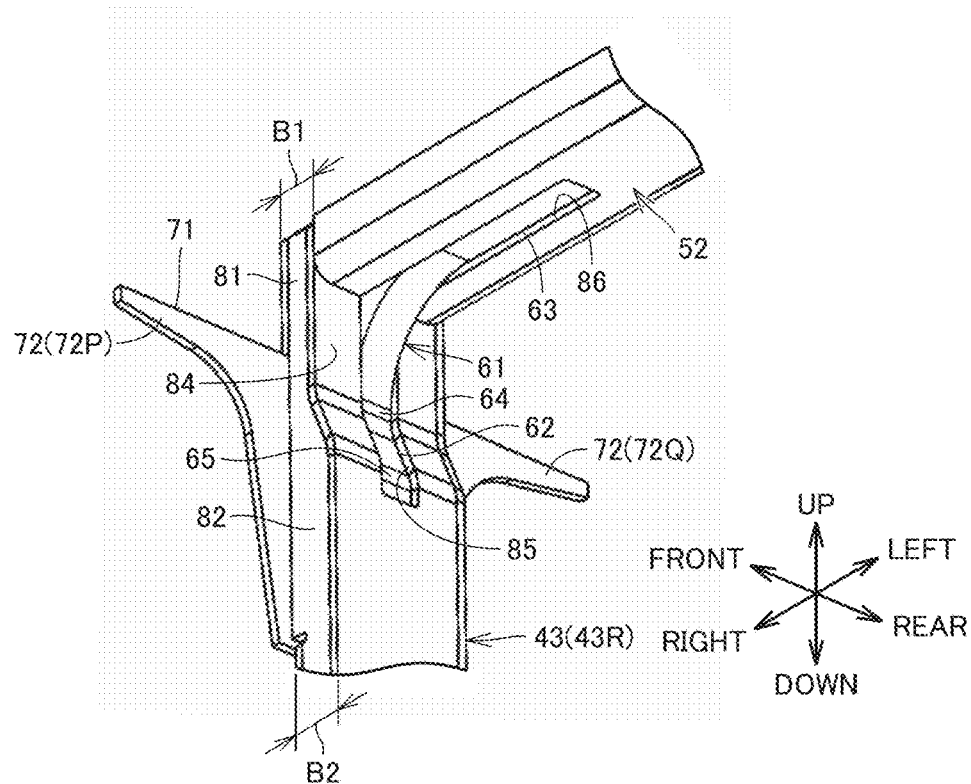
FIG. 9 is a perspective view showing a state in which a ceiling member and girder members have been removed from the cab shown in FIG. 7.
Figure 10:
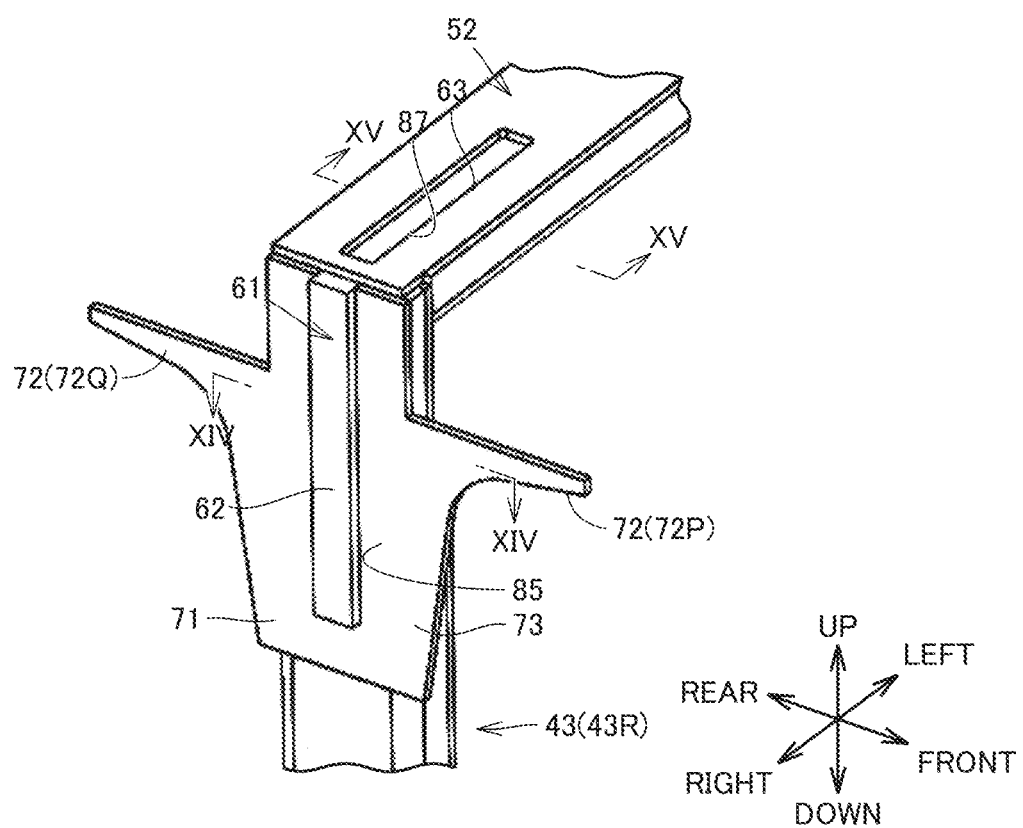
FIG. 10 is a perspective view showing a state in which the ceiling member and the girder members have been removed from the cab shown in FIG. 8.
Figure 11:
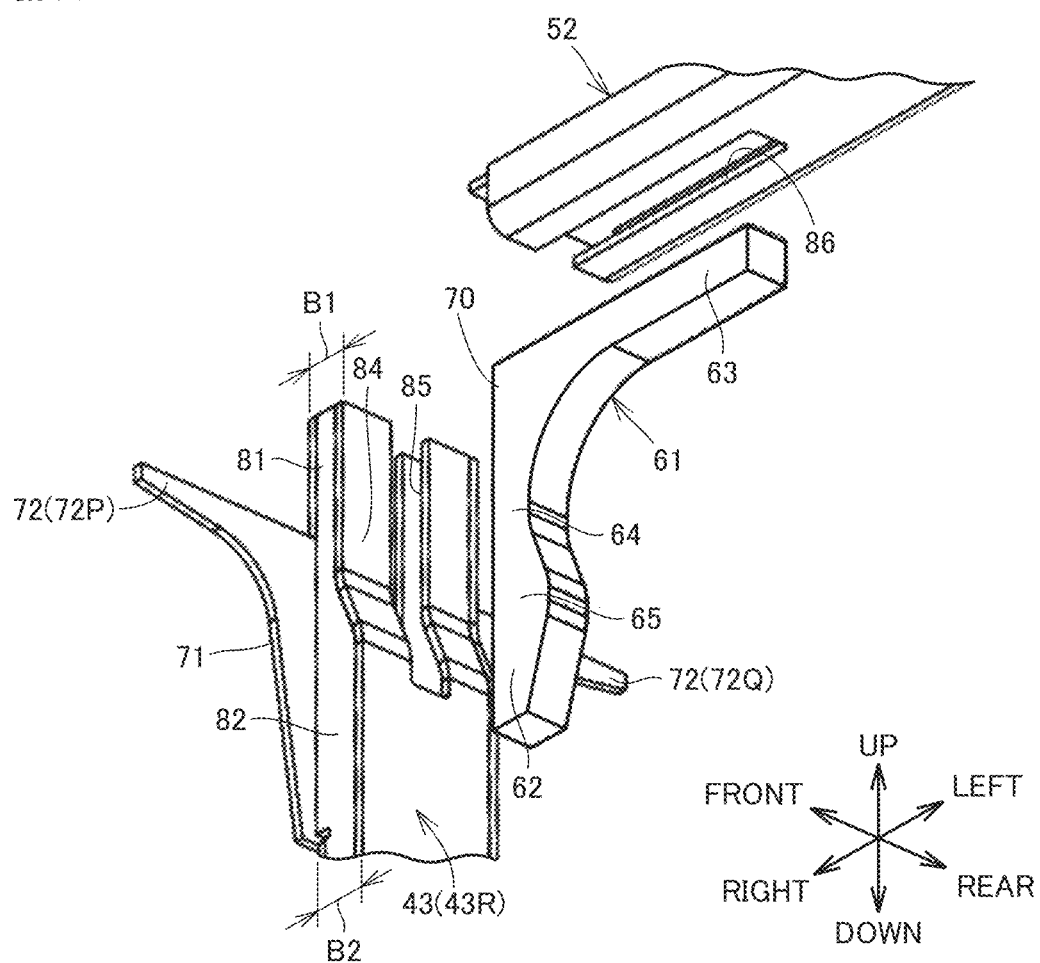
FIG. 11 is an exploded view of the cab shown in FIG. 9.
Figure 12:
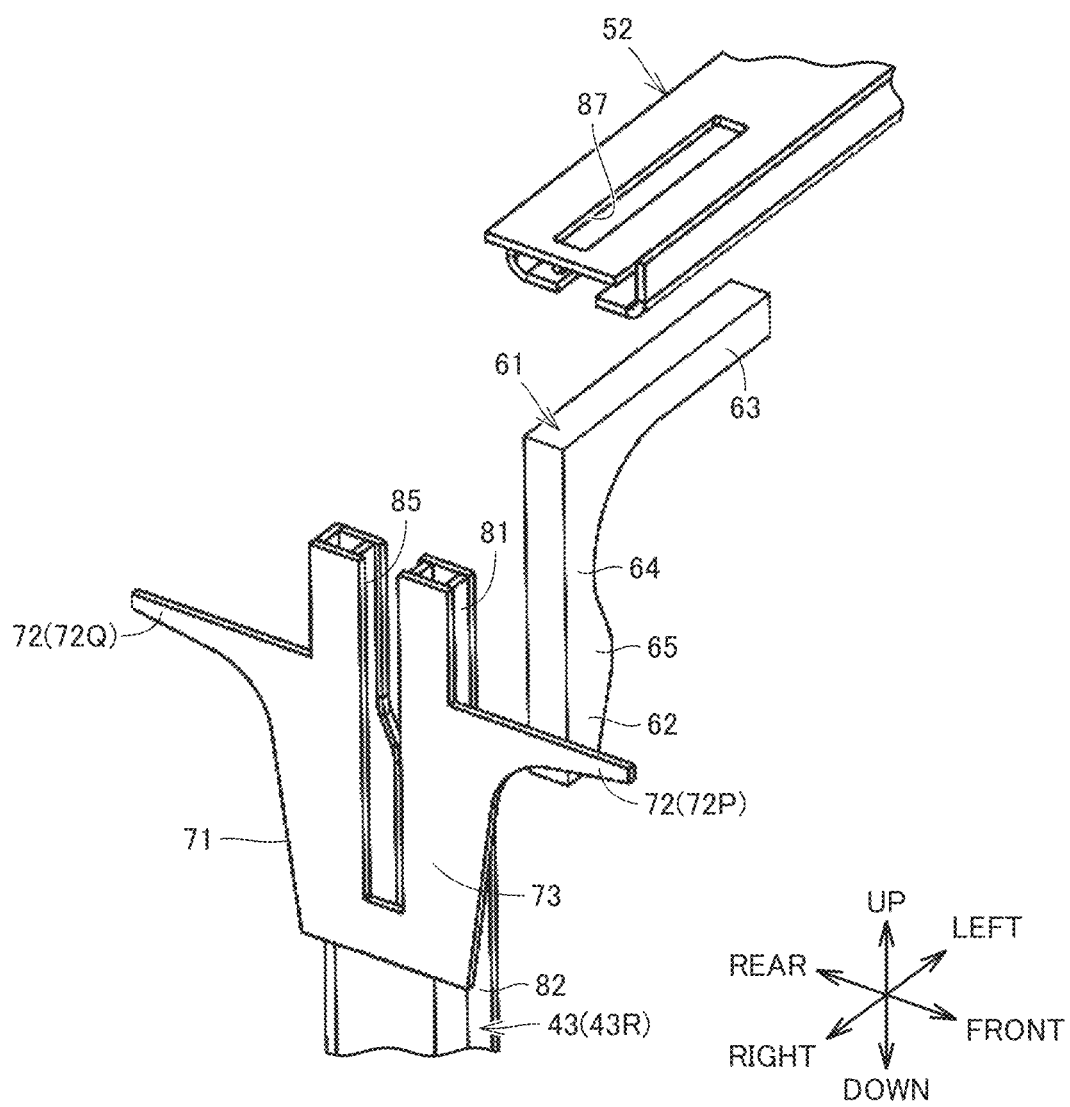
FIG. 12 is an exploded view of the cab shown in FIG. 10.

FIG. 7 is a perspective view showing the cab in a range surrounded by a two-dot chain line VII in FIG. 3 in an enlarged manner. FIG. 8 is a perspective view showing the cab in a range surrounded by a two-dot chain line VIII in FIG. 2 in an enlarged manner. FIGS. 9 and 10 are perspective views showing a state in which the ceiling member and the girder members have been removed from the cab shown in FIGS. 7 and 8, respectively. FIGS. 11 and 12 are exploded views of the cab shown in FIGS. 9 and 10, respectively.

As shown in FIGS. 7 to 12, cab 30 further includes a rib member 61. Rib member 61 is provided at the corner portion where pillar member 43R and beam member 52 intersect with each other. Rib member 61 is connected to pillar member 43R and beam member 52.

Rib member 61 is provided at the corner portion where the right end of beam member 52 and the upper end of pillar member 43R intersect with each other. Rib member 61 is formed of a plate member (e.g., a steel plate). Rib member 61 is provided such that the front-rear direction corresponds to a thickness direction. Rib member 61 is connected to pillar member 43R and beam member 52 by welding.

Rib member 61 is embedded in at least one of pillar member 43R and beam member 52. Rib member 61 is embedded in pillar member 43R and beam member 52. Rib member 61 is provided such that at least a part of rib member 61 is arranged in a slit 85 and a slit 86 as recessed portions provided in pillar member 43R and beam member 52. Rib member 61 is provided such that at least a part of rib member 61 overlaps with pillar member 43R and beam member 52 when seen in the front-rear direction.

Figure 13:
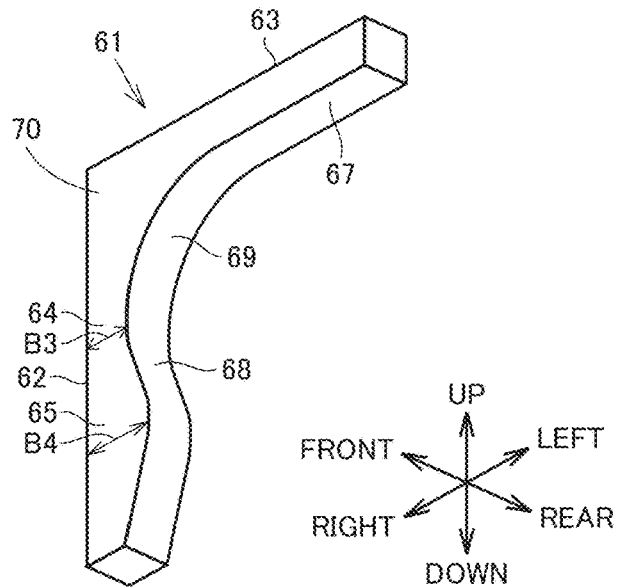
FIG. 13 is a perspective view showing a rib member in FIGS. 7 to 12.

FIG. 13 is a perspective view showing the rib member in FIGS. 7 to 12. As shown in FIG. 13, rib member 61 includes a vertical rib portion 62 and a horizontal rib portion 63.

Vertical rib portion 62 extends in the up-down direction. Horizontal rib portion 63 extends in the left-right direction. Horizontal rib portion 63 (a right end of horizontal rib portion 63) is continuous to an upper end of vertical rib portion 62. Rib member 61 as a whole has an L shape including a corner portion 70 at a position where vertical rib portion 62 and horizontal rib portion 63 intersect with each other, when seen in the front-rear direction.

Figure 14:
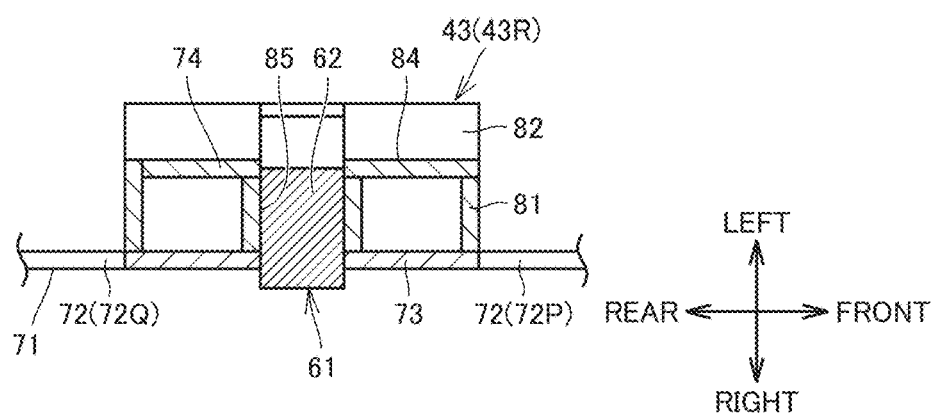
FIG. 14 is a cross-sectional view showing the cab when seen in a direction indicated by an arrow line XIV-XIV in FIG. 10.

FIG. 14 is a cross-sectional view showing the cab when seen in a direction indicated by an arrow line XIV-XIV in FIG. 10. As shown in FIGS. 7 to 12 and 14, vertical rib portion 62 is embedded in pillar member 43R.

Pillar member 43R is formed of a hollow pipe member. Pillar member 43R has a rectangular cross-sectional shape when cut along a horizontal plane.

Pillar member 43R includes an inner plate portion 74 and an outer plate portion 73. Inner plate portion 74 is formed of a plate member in which the left-right direction corresponds to a thickness direction. Outer plate portion 73 is formed of a plate member 71 in which the left-right direction corresponds to a thickness direction. Inner plate portion 74 and outer plate portion 73 are arranged to be spaced apart from each other in the left-right direction. Inner plate portion 74 is provided in pillar member 43R and inside living space 120 for the operator. Outer plate portion 73 is provided in pillar member 43R and outside living space 120 for the operator.

Pillar member 43R is provided with slit 85. Slit 85 has an opening shape that can receive vertical rib portion 62. Slit 85 extends in the up-down direction. Slit 85 reaches a tip of the upper end of pillar member 43R in the up-down direction. Slit 85 has a slit shape in which the front-rear direction corresponds to a width direction and the up-down direction corresponds to a longitudinal direction. Slit 85 passes through pillar member 43R in the left-right direction. Slit 85 is open to inner plate portion 74 and outer plate portion 73.

Vertical rib portion 62 is arranged in slit 85. Vertical rib portion 62 is provided so as not to protrude from inner plate portion 74 toward the inside of living space 120 for the operator at a position other than corner portion 70. Vertical rib portion 62 is provided to protrude from outer plate portion 73 toward the outside of living space 120 for the operator. Inner plate portion 74 and outer plate portion 73 sandwich vertical rib portion 62 arranged in slit 85 in the front-rear direction. Vertical rib portion 62 is inserted through pillar member 43R in the left-right direction.

Vertical rib portion 62 is connected to pillar member 43R by welding. Vertical rib portion 62 and pillar member 43R are, for example, welded along an opening edge of slit 85 in inner plate portion 74 and outer plate portion 73.

The material of pillar member 43R is not limited to the above-described pipe member, and pillar member 43R may be formed of a solid member. Pillar member 43R may be provided with a groove portion having a bottom that can receive vertical rib portion 62.

Figure 15:
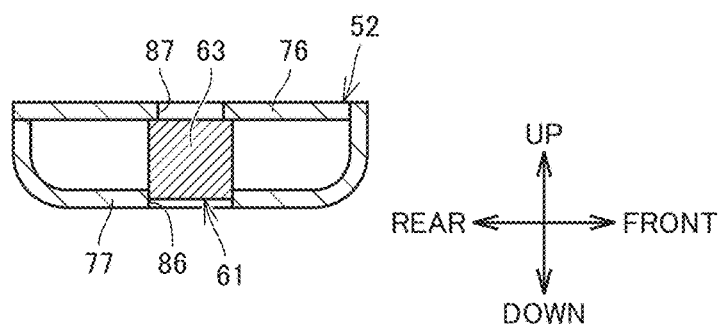
FIG. 15 is a cross-sectional view showing the cab when seen in a direction indicated by an arrow line XV-XV in FIG. 10.

FIG. 15 is a cross-sectional view showing the cab when seen in a direction indicated by an arrow line XV-XV in FIG. 10. As shown in FIGS. 7 to 12 and 15, horizontal rib portion 63 is embedded in beam member 52.

Beam member 52 is formed of a hollow pipe member. Beam member 52 has a rectangular cross-sectional shape when cut along a plane that is orthogonal to the left-right direction.

Beam member 52 includes an upper plate portion 76 and a lower plate portion 77. Each of upper plate portion 76 and lower plate portion 77 is formed of a plate member in which the up-down direction corresponds to a thickness direction. Upper plate portion 76 and lower plate portion 77 are arranged to be spaced apart from each other in the up-down direction. Upper plate portion 76 is provided in beam member 52 and outside living space 120 for the operator. Lower plate portion 77 is provided in beam member 52 and inside living space 120 for the operator.

Beam member 52 is provided with slit 86 and an opening 87. Slit 86 and opening 87 extend in the left-right direction. Slit 86 and opening 87 have a slit shape in which the front-rear direction corresponds to a width direction and the left-right direction corresponds to a longitudinal direction. Slit 86 passes through lower plate portion 77. Slit 86 reaches a tip of a right end of lower plate portion 77 in the left-right direction. Opening 87 passes through upper plate portion 76.

Horizontal rib portion 63 is arranged in slit 86. Horizontal rib portion 63 is provided so as not to protrude from beam member 52 toward the inside of living space 120 for the operator at a position other than corner portion 70. Horizontal rib portion 63 is provided so as not to protrude from beam member 52 toward the outside of living space 120 for the operator. Horizontal rib portion 63 is inserted into beam member 52 through slit 86. Lower plate portion 77 sandwiches horizontal rib portion 63 arranged in slit 86 in the front-rear direction. Horizontal rib portion 63 abuts against upper plate portion 76 inside beam member 52. Horizontal rib portion 63 is exposed to the outside of beam member 52 through opening 87.

Horizontal rib portion 63 is connected to beam member 52 by welding. Horizontal rib portion 63 and beam member 52 are, for example, welded along an opening edge of slit 86 in lower plate portion 77 and an opening edge of opening 87 in upper plate portion 76.

The material of beam member 52 is not limited to the above-described pipe member, and beam member 52 may be formed of a solid member. Beam member 52 may be provided with a groove portion having a bottom that can receive horizontal rib portion 63. In addition, the configuration in which horizontal rib portion 63 is embedded in beam member 52 may be replaced with the configuration in which vertical rib portion 62 is embedded in pillar member 43R, or the configuration in which vertical rib portion 62 is embedded in pillar member 43R may be replaced with the configuration in which horizontal rib portion 63 is embedded in beam member 52.

When seen in the front-rear direction, an area of vertical rib portion 62 that overlaps with pillar member 43R is equal to or larger than an area of vertical rib portion 62 that does not overlap with pillar member 43R (that protrudes from pillar member 43R toward the inside and/or the outside of living space 120 for the operator). When seen in the front-rear direction, the area of vertical rib portion 62 that overlaps with pillar member 43R may be smaller than the area of vertical rib portion 62 that does not overlap with pillar member 43R.

When seen in the front-rear direction, an area of horizontal rib portion 63 that overlaps with beam member 52 is equal to or larger than an area of horizontal rib portion 63 that does not overlap with beam member 52 (that protrudes from beam member 52 toward the inside and/or the outside of living space 120 for the operator). When seen in the front-rear direction, the area of horizontal rib portion 63 that overlaps with beam member 52 may be smaller than the area of horizontal rib portion 63 that does not overlap with beam member 52.

Vertical rib portion 62 may be provided so as not to protrude from pillar member 43R toward the inside and/or the outside of living space 120 for the operator. Horizontal rib portion 63 may be provided so as not to protrude from beam member 52 toward the inside and/or the outside of living space 120 for the operator.

As shown in FIG. 1, hydraulic excavator 100 may perform operations on a rough terrain or an inclined terrain, depending on an operation purpose or an operation environment, and thus, hydraulic excavator 100 may fall down in such an operation place. When hydraulic excavator 100 falls down, excessive external force (particularly, horizontal force to left surface 30D) is applied to cab 30. In such a case, it is required to effectively suppress deformation of cab 30 in order to appropriately protect the operator in cab 30.

In order to deal with this, as shown in FIGS. 6 to 12, in hydraulic excavator 100, rib member 61 is provided at the corner portion where pillar member 43 (43L, 43R) and beam member 52 intersect with each other. Such a configuration can achieve an increase in strength of the connection portion that connects pillar member 43 and beam member 52. Thus, it is possible to suppress the occurrence of buckling at the connection portion that connects pillar member 43 and beam member 52 when hydraulic excavator 100 falls down, which causes large deformation of cab 30.

In addition, in hydraulic excavator 100, a highly rigid rollover protective structure (ROPS) is implemented by above-described pillar member 43 and beam member 52 that form a gate shape around living space 120 for the operator. Thus, it is possible to effectively suppress the deformation of cab 30.

Rib member 61 is embedded in pillar member 43 and beam member 52. According to such a configuration, it is possible to suppress protrusion of rib member 61 from pillar member 43 and beam member 52 toward living space 120 for the operator. Thus, wide living space 120 for the operator can be secured at the corner portion where pillar member 43 and beam member 52 intersect with each other.

If the rib member is provided so as not to be embedded in pillar member 43, it is necessary to provide rail member 56 at a position distant from pillar member 43 in the left-right direction, in order to avoid interference between rail member 56 and the rib member. In this case, it is concerned that living space 120 for the operator may be invaded greatly in the left-right direction by rail member 56, or the width of front transparent member 46 in the left-right direction may decrease, which may cause poor visibility from the operator.

If the rib member is provided so as not to be embedded in beam member 52, it is necessary to provide duct member 96 at a position distant from and on the lower side of beam member 52, in order to avoid interference between duct member 96 and the rib member. In this case, it is concerned that living space 120 for the operator may be invaded greatly in the up-down direction by duct member 96.

In hydraulic excavator 100, rib member 61 is provided such that vertical rib portion 62 is embedded in pillar member 43 and horizontal rib portion 63 is embedded in beam member 52, and thus, the above-described concerns can be resolved. In addition, wide living space 120 for the operator is secured, and thus, operator protection space 130 for protecting the operator when hydraulic excavator 100 falls down can be easily set in cab 30.

In addition, pillar member 43 is provided with slit 85 that passes through pillar member 43 in the left-right direction, and vertical rib portion 62 is arranged in slit 85. With such a configuration, the integrity of pillar member 43 and vertical rib portion 62 is increased, and thus, rib member 61 can more effectively contribute to an increase in connection strength between pillar member 43 and beam member 52.

As shown in FIGS. 6, 9 and 11, pillar member 43R includes an upper pillar portion 81 and a lower pillar portion 82. Lower pillar portion 82 is located below upper pillar portion 81. A lower end of lower pillar portion 82 is connected to floor member 40 shown in FIG. 2. An upper end of upper pillar portion 81 is connected to beam member 52.

Lower pillar portion 82 has a width B2 in the left-right direction. Upper pillar portion 81 has a width B1 smaller than width B2 in the left-right direction (B1<B2). A cross-sectional area of upper pillar portion 81 when cut along a horizontal plane is smaller than a cross-sectional area of lower pillar portion 82 when cut along a horizontal plane.

Between beam member 52 and lower pillar portion 82 in the up-down direction, upper pillar portion 81 has a recessed shape that is recessed from the inside toward the outside of cab 30 in the left-right direction. The inside of cab 30 corresponds to the inside of living space 120 for the operator, and the outside of cab 30 corresponds to the outside of living space 120 for the operator. A distance in the left-right direction between upper pillar portion 81 of pillar member 43R and upper pillar portion 81 of pillar member 43L is longer than a distance in the left-right direction between lower pillar portion 82 of pillar member 43R and lower pillar portion 82 of pillar member 43L.

Slit 85 is provided over the whole of upper pillar portion 81 in the up-down direction. Slit 85 is provided to extend from upper pillar portion 81 to an upper end of lower pillar portion 82 in the up-down direction.

According to such a configuration, upper pillar portion 81 has a recessed shape that is recessed from the inside toward the outside of cab 30 in the left-right direction, and thus, wider living space 120 for the operator can be secured at the corner portion where pillar member 43 (43L, 43R) and beam member 52 intersect with each other. In addition, width B2 of lower pillar portion 82 in the left-right direction is greater than width B1 of upper pillar portion 81 in the left-right direction. Therefore, the rigidity of pillar member 43 can be increased on the base side connected to floor member 40.

Upper pillar portion 81 includes a pillar inner surface 84. Pillar inner surface 84 is provided to face the inside of cab 30. Pillar inner surface 84 is formed of a plane. Pillar inner surface 84 is formed of a plane that is orthogonal to the left-right direction. Rail member 56R is provided along pillar inner surface 84. Rail member 56R is attached to pillar inner surface 84.

According to such a configuration, rail member 56 (56L, 56R) is provided along pillar inner surface 84 formed of a plane, and thus, rail member 56 can be provided in a stable attitude. In addition, a space is formed on the lateral side of pillar inner surface 84 due to the recessed shape of upper pillar portion 81, and thus, it is possible to more effectively suppress great invasion of living space 120 for the operator by rail member 56.

As shown in FIG. 6, a length (height) H1 of rail member 56R from pillar inner surface 84 in the left-right direction is equal to or less than a length (height) H2 of a height difference between upper pillar portion 81 and lower pillar portion 82 in the left-right direction (H1≤H2). Length (height) H1 of rail member 56R from pillar inner surface 84 in the left-right direction may be equal to length (height) H2 of the height difference between upper pillar portion 81 and lower pillar portion 82 in the left-right direction (H1=H2).

With such a configuration, rail member 56 (56L, 56R) does not protrude from lower pillar portion 82 in the left-right direction, and thus, it is possible to more effectively suppress great invasion of living space 120 for the operator by rail member 56.

Length (height) H1 of rail member 56R from pillar inner surface 84 in the left-right direction may be equivalent to length (height) H2 of the height difference between upper pillar portion 81 and lower pillar portion 82 in the left-right direction. In this case, an absolute value of a difference between length H1 and length H2 (|H1−H2|) is equal to or smaller than a value of 1/10 of H2 (|H1−H2|≤H2×1/10).

According to such a configuration, the length of rail member 56 (56L, 56R) that protrudes from lower pillar portion 82 in the left-right direction does not increase significantly, and thus, it is possible to suppress great invasion of living space 120 for the operator by rail member 56 similarly to the foregoing.

As shown in FIGS. 9, 11 and 13, vertical rib portion 62 includes a wide portion 65 and a narrow portion 64.

Wide portion 65 is located below narrow portion 64. Wide portion 65 is embedded in lower pillar portion 82. Wide portion 65 is arranged in slit 85 provided at the upper end of lower pillar portion 82. Narrow portion 64 is embedded in upper pillar portion 81. Narrow portion 64 is arranged in slit 85 provided in upper pillar portion 81.

Wide portion 65 has a width B4 in the left-right direction. Narrow portion 64 has a width B3 smaller than width B4 in the left-right direction (B3<B4). A width of vertical rib portion 62 in the left-right direction decreases from wide portion 65 toward narrow portion 64. The width of vertical rib portion 62 in the left-right direction has a minimum value at narrow portion 64 and increases from narrow portion 64 toward the upper side. The width of vertical rib portion 62 in the left-right direction has a maximum value at wide portion 65 and decreases from wide portion 65 toward the lower side.

Between beam member 52 and lower pillar portion 82 in the up-down direction, upper pillar portion 81 has a recessed shape that is recessed from the inside toward the outside of cab 30 in the left-right direction. Therefore, the height difference in the left-right direction is provided in a boundary portion between upper pillar portion 81 and lower pillar portion 82. In contrast, vertical rib portion 62 has such a shape that the width of vertical rib portion 62 in the left-right direction decreases from wide portion 65 toward narrow portion 64. Therefore, the width of vertical rib portion 62 in the left-right direction can be changed in accordance with the shape of the height difference between upper pillar portion 81 and lower pillar portion 82 in the left-right direction. Thus, it is possible to more effectively suppress protrusion of vertical rib portion 62 from pillar member 43 toward living space 120 for the operator.

As shown in FIG. 13, vertical rib portion 62 includes a vertical rib inner surface 68. Vertical rib inner surface 68 is provided to face the inside of cab 30. Vertical rib inner surface 68 is provided to face the left side. In narrow portion 64, vertical rib inner surface 68 has a valley shape that is recessed toward the outside of cab 30. In wide portion 65, vertical rib inner surface 68 has a peak shape that protrudes toward the inside of cab 30.

Horizontal rib portion 63 includes a horizontal rib inner surface 67. Horizontal rib inner surface 67 is provided to face the inside of cab 30. Horizontal rib inner surface 67 is provided to face the lower side.

Vertical rib inner surface 68 and horizontal rib inner surface 67 are continuous to each other with a curved surface 69 interposed therebetween. Curved surface 69 is provided at corner portion 70 of rib member 61. Curved surface 69 has an arc shape having a constant curvature. The center of the arc shape of curved surface 69 is located in living space 120 for the operator.

According to such a configuration, vertical rib inner surface 68 and horizontal rib inner surface 67 are continuous to each other with curved surface 69 interposed therebetween. Therefore, even when excessive external force is applied to the connection portion that connects pillar member 43 and beam member 52, the occurrence of stress concentration on corner portion 70 of rib member 61 can be suppressed. Thus, it is possible to more effectively suppress deformation of cab 30.

As shown in FIGS. 7 to 12, girder member 54R and girder member 55R are butted against the upper end of pillar member 43R (upper pillar portion 81) in the front-rear direction. Girder member 54R and girder member 55R are connected, by welding, to pillar member 43R at the position where girder member 54R and girder member 55R are butted.

Pillar member 43R further includes connection portions 72 (72P and 72Q).

Each of connection portions 72 is formed of a plate member in which the left-right direction corresponds to a thickness direction. Connection portions 72 are formed of plate member 71 together with outer plate portion 73. Connection portions 72 extend to protrude in the front-rear direction. Connection portions 72 have an arm shape extending to protrude in the front-rear direction from outer plate portion 73.

Connection portion 72P and connection portion 72Q are provided to be paired in the front-rear direction. Connection portion 72P extends to protrude from outer plate portion 73 toward the front side. Connection portion 72P is provided along a lower end of girder member 54R. Girder member 54R is connected to connection portion 72P by welding. Connection portion 72Q extends to protrude from outer plate portion 73 toward the rear side. Connection portion 72Q is provided along a lower end of girder member 55R. Girder member 55R is connected to connection portion 72Q by welding.

According to such a configuration, girder member 54R is connected to connection portion 72P along the front-rear direction, in addition to the upper end of pillar member 43R, and girder member 55R is connected to connection portion 72Q along the front-rear direction, in addition to the upper end of pillar member 43R. Therefore, the connection strength between pillar member 43R and girder members 54R and 55R can be increased.

Although description has been given of the case in which connection portions 72 (72P and 72Q) and outer plate portion 73 are formed of integrated plate member 71, the present disclosure is not limited thereto. The plate member including connection portions 72 (72P and 72Q) may be joined to the plate member that forms outer plate portion 73 from outside living space 120 for the operator.

The configuration and effect of cab 30 and hydraulic excavator 100 according to the present embodiment described above will be summarized.

Cab 30 includes: pillar member 43; beam member 52; and rib member 61. Pillar member 43 extends in an up-down direction. Beam member 52 extends in a left-right direction. Beam member 52 is connected to an upper end of pillar member 43. Rib member 61 is provided at a corner portion where pillar member 43 and beam member 52 intersect with each other. Rib member 61 is connected to pillar member 43 and beam member 52. Rib member 61 is embedded in pillar member 43 and beam member 52 as at least one of pillar member 43 and beam member 52.

According to such a configuration, rib member 61 is provided at the corner portion where pillar member 43 and beam member 52 intersect with each other, and thus, the connection strength between pillar member 43 and beam member 52 can be increased. Therefore, it is possible to achieve highly-rigid cab 30 that is less likely to become deformed even when excessive external force is applied. Since rib member 61 is embedded in pillar member 43 and beam member 52, it is possible to suppress protrusion of rib member 61 from pillar member 43 and beam member 52 toward living space 120 for the operator, which is a space in cab 30. Thus, wide living space 120 for the operator can be secured at the corner portion where pillar member 43 and beam member 52 intersect with each other.

Rib member 61 is embedded in pillar member 43. Pillar member 43 includes upper pillar portion 81 and lower pillar portion 82. Upper pillar portion 81 is connected to beam member 52. Lower pillar portion 82 is located below upper pillar portion 81. Upper pillar portion 81 has a width smaller than that of lower pillar portion 82 in the left-right direction. Between beam member 52 and lower pillar portion 82 in the up-down direction, upper pillar portion 81 has a recessed shape that is recessed from an inside toward an outside of cab 30 in the left-right direction.

According to such a configuration, rib member 61 is embedded in pillar member 43 and upper pillar portion 81 has a recessed shape that is recessed from the inside toward the outside of cab 30 in the left-right direction. Therefore, wider living space 120 for the operator can be secured at the corner portion where pillar member 43 and beam member 52 intersect with each other. In addition, since lower pillar portion 82 has a width greater than that of upper pillar portion 81 in the left-right direction, the rigidity of pillar member 43 can be increased in lower pillar portion 82.

Upper pillar portion 81 includes pillar inner surface 84. Pillar inner surface 84 is provided to face the inside of cab 30. Pillar inner surface 84 is formed of a plane. Cab 30 further includes rail member 56. Rail member 56 extends in a front-rear direction and is provided along pillar inner surface 84.

According to such a configuration, rail member 56 is provided along pillar inner surface 84 formed of a plane, and thus, rail member 56 can be provided in a stable attitude. In addition, since a space is formed on the lateral side of pillar inner surface 84 due to the recessed shape of upper pillar portion 81, it is possible to suppress great invasion of living space 120 for the operator by rail member 56.

A length of rail member 56 from pillar inner surface 84 in the left-right direction is equal to or shorter than a length of a height difference between upper pillar portion 81 and lower pillar portion 82 in the left-right direction. A length of rail member 56 from pillar inner surface 84 in the left-right direction may be equivalent to a length of a height difference between upper pillar portion 81 and lower pillar portion 82 in the left-right direction.

According to such a configuration, it is possible to more effectively suppress great invasion of living space 120 for the operator by rail member 56.

Rib member 61 includes vertical rib portion 62. Vertical rib portion 62 is embedded in pillar member 43. Vertical rib portion 62 includes wide portion 65 and narrow portion 64. Wide portion 65 is embedded in lower pillar portion 82. Narrow portion 64 is embedded in upper pillar portion 81. Narrow portion 64 has a width smaller than that of wide portion 65 in the left-right direction. A width of vertical rib portion 62 in the left-right direction decreases from wide portion 65 toward narrow portion 64.

According to such a configuration, the width of vertical rib portion 62 in the left-right direction can be changed in accordance with the shape of the height difference between upper pillar portion 81 and lower pillar portion 82 in the left-right direction. Thus, it is possible to more effectively suppress protrusion of vertical rib portion 62 from pillar member 43 toward living space 120 for the operator.

Rib member 61 includes vertical rib portion 62. Vertical rib portion 62 is embedded in pillar member 43. Pillar member 43 is provided with slit 85. Slit 85 passes through pillar member 43 in the left-right direction. Slit 85 extends in the up-down direction. Vertical rib portion 62 is arranged in slit 85.

According to such a configuration, the integrity of pillar member 43 and vertical rib portion 62 is increased, and thus, rib member 61 can more effectively contribute to an increase in connection strength between pillar member 43 and beam member 52.

Pillar member 43 includes plate member 71. Plate member 71 is provided such that the left-right direction corresponds to a thickness direction. In plate member 71, slit 85 is open. Plate member 71 includes connection portion 72 (72P, 72Q). Connection portion 72 (72P, 72Q) extends in a front-rear direction. Cab 30 further includes girder member 54 and girder member 55. Girder member 54 and girder member 55 extend in the front-rear direction. Girder member 54 and girder member 55 are connected to the upper end of pillar member 43 and connection portion 72 (72P, 72Q).

According to such a configuration, girder member 54 is connected to connection portion 72P along the front-rear direction, and girder member 55 is connected to connection portion 72Q along the front-rear direction. Therefore, the connection strength between pillar member 43 and girder members 54 and 55 can be increased.

Rib member 61 is embedded in beam member 52. Cab 30 further includes duct member 96. Duct member 96 is provided below beam member 52.

According to such a configuration, rib member 61 is embedded in beam member 52, and thus, duct member 96 can be provided directly below beam member 52. Thus, it is possible to suppress great invasion of living space 120 for the operator by duct member 96.

The rib member includes vertical rib portion 62 and horizontal rib portion 63. Vertical rib portion 62 is embedded in pillar member 43. Horizontal rib portion 63 is continuous to an upper end of vertical rib portion 62. Horizontal rib portion 63 is embedded in beam member 52. Vertical rib portion 62 includes vertical rib inner surface 68. Vertical rib inner surface 68 is provided to face an inside of cab 30. Horizontal rib portion 63 includes horizontal rib inner surface 67. Horizontal rib inner surface 67 is provided to face the inside of cab 30. Horizontal rib inner surface 67 is continuous to vertical rib inner surface 68 with curved surface 69 interposed therebetween.

According to such a configuration, horizontal rib inner surface 67 is continuous to vertical rib inner surface 68 with curved surface 69 interposed therebetween, and thus, the occurrence of stress concentration on corner portion 70 of rib member 61 where vertical rib portion 62 and horizontal rib portion 63 intersect with each other can be suppressed.

Cab 30 further includes, as pillar member 43, pillar member 43R as a first pillar member and pillar member 43L as a second pillar member. Pillar member 43R and pillar member 43L are arranged to be spaced apart from each other in the left-right direction. One end of beam member 52 in the left-right direction is connected to an upper end of pillar member 43R. The other end of beam member 52 in the left-right direction is connected to an upper end of pillar member 43L.

According to such a configuration, the connection strength between beam member 52 and pillar members 43R and 43L is increased by rib member 61. Therefore, a highly rigid rollover protective structure (ROPS) can be implemented by pillar member 43R, beam member 52 and pillar member 43L.

Hydraulic excavator 100 as a work vehicle includes cab 30. According to such a configuration, deformation of cab 30 when hydraulic excavator 100 falls down can be effectively suppressed. In addition, operator protection space 130 for protecting the operator can be easily set in cab 30.

Although the configuration in which rib member 61 is embedded in both of pillar member 43 and beam member 52 has been described in the present embodiment, rib member 61 may be embedded in one of pillar member 43 and beam member 52.

In addition, the cab in the present disclosure is applicable not only to the hydraulic excavator but also to work vehicles such as, for example, a crane, a wheel loader and a motor grader.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 11 vehicular body; 12 work implement; 13 revolving unit; 15 traveling unit; 15Cr crawler belt; 15M traveling motor; 16 boom; 17 arm; 18 bucket; 19 engine compartment; 20A, 20B boom cylinder; 21 arm cylinder; 22 bucket cylinder; 23 boom pin; 24 arm pin; 25 bucket pin; 26 center of swing; 30 cab; 30A front surface; 30B rear surface; 30C right surface; 30D left surface; 30E top surface; 30F bottom surface; 31 operator's seat; 32 door member; 40 floor member; 42, 42L, 42R, 43, 43L, 43R, 44, 44L, 44R pillar member; 45 ceiling member; 46 front transparent member; 47 lower transparent member; 48 lateral transparent member; 51, 52, 53 beam member; 54, 54L, 54R, 55, 55L, 55R girder member; 56, 56L, 56R rail member; 61 rib member; 62 vertical rib portion; 63 horizontal rib portion; 64 narrow portion; 65 wide portion; 67 horizontal rib inner surface; 68 vertical rib inner surface; 69 curved surface; 70 corner portion; 71 plate member; 72, 72P, 72Q connection portion; 73 outer plate portion; 74 inner plate portion; 76 upper plate portion; 77 lower plate portion; 81 upper pillar portion; 82 lower pillar portion; 84 pillar inner surface; 85, 86 slit; 87 opening; 91 frame; 92 roller; 96 duct member; 100 hydraulic excavator; 120 living space; 130 operator protection space.

The invention claimed is:

1. A cab comprising:
a pillar member extending in an up-down direction;
a beam member extending in a left-right direction and connected to an upper end of the pillar member; and
a rib member provided at a corner portion where the pillar member and the beam member intersect with each other, and connected to the pillar member and the beam member, wherein
the rib member includes a vertical rib portion embedded in the pillar member,
the pillar member includes an upper pillar portion connected to the beam member, and a lower pillar portion located below the upper pillar portion,
the upper pillar portion has a width smaller than that of the lower pillar portion in the left-right direction, and between the beam member and the lower pillar portion in the up-down direction, the upper pillar portion has a recessed shape that is recessed from an inside toward an outside of the cab in the left-right direction, and
the vertical rib portion includes a wide portion embedded in the lower pillar portion, and a narrow portion embedded in the upper pillar portion and having a width smaller than that of the wide portion in the left-right direction.

2. The cab according to claim 1, wherein
the upper pillar portion includes a pillar inner surface provided to face the inside of the cab and formed of a plane,
the cab further comprising
a rail member extending in a front-rear direction and provided along the pillar inner surface.

3. The cab according to claim 2, wherein
a length of the rail member from the pillar inner surface in the left-right direction is equal to or shorter than a length of a height difference between the upper pillar portion and the lower pillar portion in the left-right direction.

4. The cab according to claim 2, wherein
a length of the rail member from the pillar inner surface in the left-right direction is equivalent to a length of a height difference between the upper pillar portion and the lower pillar portion in the left-right direction.

5. The cab according to claim 1, wherein
a width of the vertical rib portion in the left-right direction decreases from the wide portion toward the narrow portion.

6. The cab according to claim 1, wherein
the pillar member is provided with a slit passing through the pillar member in the left-right direction and extending in the up-down direction, and
the vertical rib portion is arranged in the slit.

7. The cab according to claim 6, wherein
the pillar member includes a plate member in which the left-right direction corresponds to a thickness direction and the slit is open, and
the plate member includes a connection portion extending in a front-rear direction,
the cab further comprising
a girder member extending in the front-rear direction and connected to the upper end of the pillar member and the connection portion.

8. The cab according to claim 1, wherein
the rib member is embedded in the beam member,
the cab further comprising
a duct member provided below the beam member.

9. The cab according to claim 1, wherein
the rib member further includes a horizontal rib portion being continuous to an upper end of the vertical rib portion and embedded in the beam member,
the vertical rib portion includes a vertical rib inner surface provided to face an inside of the cab, and
the horizontal rib portion includes a horizontal rib inner surface provided to face the inside of the cab and being continuous to the vertical rib inner surface with a curved surface interposed therebetween.

10. The cab according to claim 1, further comprising
as the pillar member, a first pillar member and a second pillar member arranged to be spaced apart from each other in the left-right direction, wherein
one end of the beam member in the left-right direction is connected to an upper end of the first pillar member, and
the other end of the beam member in the left-right direction is connected to an upper end of the second pillar member.

11. A work vehicle comprising the cab as recited in claim 1.

* * * * *